United States Patent
Nakata

(10) Patent No.: US 6,757,491 B2
(45) Date of Patent: Jun. 29, 2004

(54) PHOTOMETRIC APPARATUS AND METHOD FOR EVALUATING BACKLIGHT

(75) Inventor: Koichi Nakata, Kokubunji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/263,606

(22) Filed: Oct. 3, 2002

(65) Prior Publication Data

US 2003/0077080 A1 Apr. 24, 2003

(30) Foreign Application Priority Data

Oct. 18, 2001 (JP) ........................................ 2001-320999

(51) Int. Cl.[7] .............................. G03B 3/00; G03B 7/08
(52) U.S. Cl. ........................ 396/121; 396/98; 396/234
(58) Field of Search ............................ 396/67, 98, 100, 396/121, 234

(56) References Cited

U.S. PATENT DOCUMENTS 4,664,495 A * 5/1987 Alyfuku et al. ............. 396/234
5,258,803 A 11/1993 Hayakawa
6,195,509 B1 * 2/2001 Nakahara ..................... 396/100

FOREIGN PATENT DOCUMENTS

JP 60213931 * 10/1985 ............. G03B/7/28

* cited by examiner

Primary Examiner—Russell Adams
Assistant Examiner—Arthur A Smith
(74) Attorney, Agent, or Firm—Straub & Pokotylo; John C. Pokotylo

(57) ABSTRACT

A photometric apparatus that enables highly precise backlight evaluation by selecting areas in a photographic frame using geometric data measured by a geometric part and comparing the brightness of a selected area with that of remaining areas. In general, the selected areas are those likely include the main subject. For example, brightness of and distance to the subject are measured in the plural area of the photographic frame. The plural areas are grouped depending on the distance measurements to the subject. Photometric measurements are made for the respective groups using brightness measurements of the subject. One group (the main subject) is selected and the difference in photometric measurement between the selected group and the others is calculated. The evaluation value for evaluating the backlight is changed depending on the position and size of the selected group in the photographic frame.

37 Claims, 12 Drawing Sheets

| number of areas \ middle position | 1~2 | 3~4 | 5~8 | 9~10 | 11~12 |
|---|---|---|---|---|---|
| 8 and more | --- | --- | 0.5 | --- | --- |
| 6~7 | --- | 1 | 0.7 | 1 | --- |
| 3~5 | 2 | 1.5 | 1 | 1.5 | 2 |
| 2 and less | 2.5 | 2 | 1.5 | 2 | 2.5 |

FIG. 14
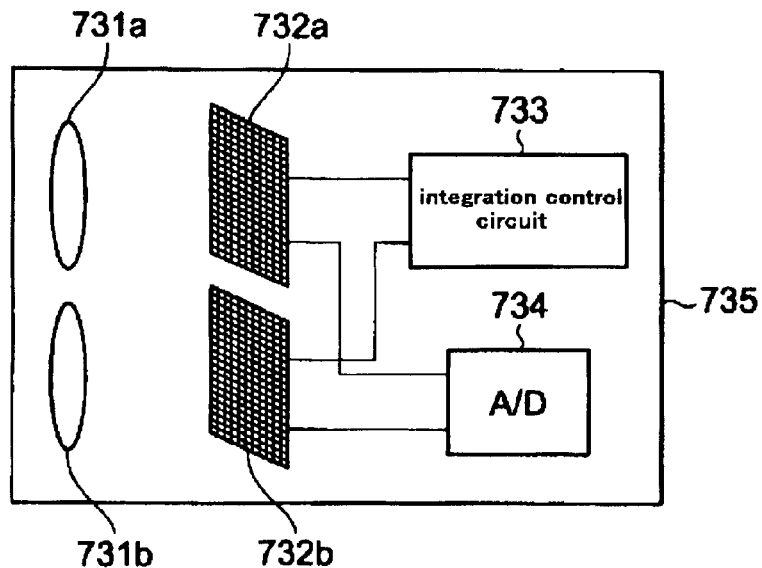
FIG. 15
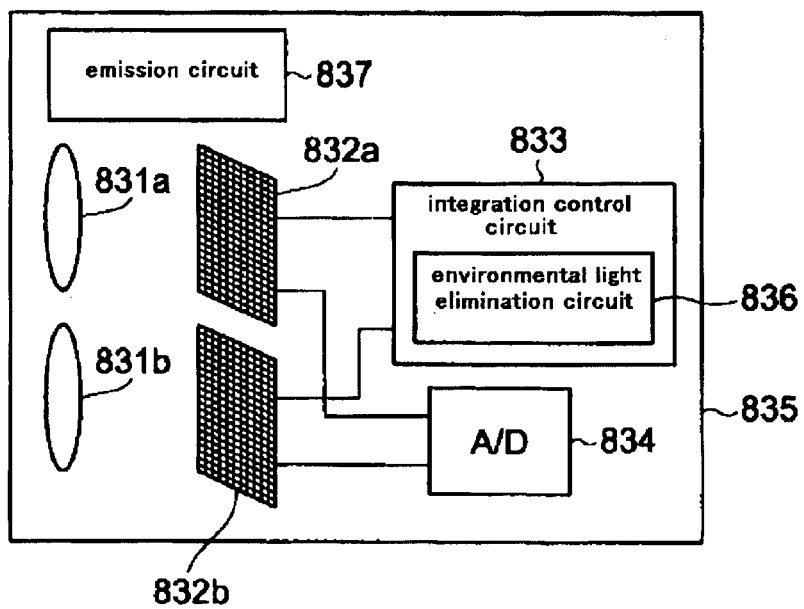
FIG. 16
| distance data | less than 1m | 1~2m | 2~4m | 3~5m | more than 5m |
|---|---|---|---|---|---|
| $K_L$ | 0.8 | 0.9 | 1 | 1.2 | 2 |

FIG. 17

| number of areas \ middle area | 1~2 | 3~4 | 5~8 | 9~10 | 11~12 |
|---|---|---|---|---|---|
| 8 or more | --- | --- | 0.5 | --- | --- |
| 6~7 | --- | --- | 0.7 | --- | --- |
| 3~5 | --- | 1 | 1 | 1 | --- |
| 2 or less | --- | 1.5 | 1 | 1.5 | --- |

FIG. 18

| focal length \ distance data | 1m or less | 1~2m | 2~4m | 3~5m | more than 5m |
|---|---|---|---|---|---|
| 38~50mm | 0.8 | 0.9 | 1 | 1.2 | 2 |
| 50~80mm | 0.8 | 0.9 | 1 | 2 | 10 |
| 80~110mm | 0.8 | 1 | 2 | 10 | 10 |

PHOTOMETRIC APPARATUS AND METHOD FOR EVALUATING BACKLIGHT

CROSS-REFERENCE TO RELATED APPLICATION

This application is based upon and claims the benefit of priority from the prior Japanese Patent Application No. 2001-320999, filed Oct. 18, 2001, the entire contents of the application are incorporated herein by reference.

BACKGROUND OF THE INVENTION

1. Field of the Invention

The present invention relates to a photometric apparatus for photographic equipment, particularly to a photometric apparatus having a backlight evaluation function.

2. Description of Related Art

The faces of people as the main subject of a picture are not well reproduced when a picture is taken in backlight using the same exposure condition as in the normal light. Therefore, a strobe emission and exposure control are required with the backlight. One of the solutions is disclosed in the U.S. Pat. No. 5,258,803. This patent discloses a camera in which the photographic frame is divided into a plurality of photometric areas and the focal point is also detected for several photometric areas that are around the center of the photographic frame. The camera uses photometric measurements for the areas that are actually used for detecting the focal point (that are selected among the photometric areas available for the focal point detection depending on the operational mode), the average photometric measurement among a certain number of surrounding areas of the above mentioned areas, the average photometric measurement among the other areas, and the maximum photometric measurement in all the areas to evaluate the backlight condition and control the strobe and exposure.

However, the method disclosed in the '803 patent above expects the subject to always be in the middle of the photographic frame. It does not take into account the size of the subject in the photographic frame. Therefore, the backlight may be mistakenly confirmed when the subject is in the margin of the photographic frame or occupies a large part of it, leading to erroneous control of the strobe and exposure.

In view of the above problems, the present invention aims to provide a photometric apparatus for a camera that enables highly precise exposure control under backlight conditions.

BRIEF SUMMARY OF THE INVENTION

The present invention uses a photometric part for measuring the brightness in a plurality of areas of the photographic range as well as a geometric part for measuring the distance to the subject in a plurality of areas of the photographic range in a photometric apparatus, such as a camera. The geometric results from the geometric part are used to select an area corresponding to the main subject in the photographic range and the brightness of the selected area are used for exposure control. In representative embodiments, the present invention compares the brightness of the selected area with that of the other areas for evaluating the backlight.

The present invention selects an area corresponding to the main subject in the photographic range. Therefore, the main subject is not necessarily at the center of the photographic range.

Preferably, the position of the main object in the photographic range is detected, to use as an evaluation factor. With this configuration, for example, considering that a main subject is highly likely near the center of the frame, a subject near the center of the frame tends to be considered to be the main subject, more than one located in the margin in order to improve the recognition of the main subject.

Preferably, the size of the main object in the photographic range is detected to use it as an evaluation factor. With this configuration, for example, considering that it is highly unlikely that a main subject occupies the entire frame, the recognition of the backlight condition is set to be easy for a larger subject rather than a smaller one in order to improve the recognition of the main subject.

Conditions regarding the position and size of a main subject in the photographic range may be conveniently stored in a table form.

The focal length and F number of the photographic lens and distances to the main subject are preferably taken into account to evaluate the backlight in order to improve the recognition of the main subject.

A main subject is preferably found in the photographic range by selecting the subject in the areas of geometric data which are within a certain range. First, an area having the closest subject is detected and, then, in the adjacent areas, the distances to the subject which are within a certain range from the smallest distance are selected.

In addition to distance data, color, brightness, and pattern of the parts in interest can be used to improve the recognition of the main subject although this complicates the apparatus.

The present invention is not confined to selecting areas including the main subject. A larger area, for example an area that is not preferred to be seen black because of backlight, can be selected.

The photometric apparatus of the present invention has application in devices such as film cameras, digital cameras, video cameras, and photographic units installed in (or mounted on) PDAs, cellular phones, and personal computers.

BRIEF DESCRIPTION OF THE DRAWINGS

These and other features, aspects, and advantages of the apparatus and methods of the present invention will become better understood with regard to the following description, appended claims, and accompanying drawings where:

FIG. 14 is an illustration to explain the geometric and photometric part of Embodiment 7 of the present invention.

FIG. 15 is an illustration to explain the geometric and photometric part of Embodiment 8 of the present invention.

FIG. 16 is a table of the backlight evaluation value correction coefficients that is referred to using the smallest geometric data of Embodiment 5 of the present invention.

FIG. 17 is a table of the backlight evaluation values for the long focal length of the photographic lens that is referred to using the number of geometric areas included in the smallest distance group and the middle area number according to Embodiment 6 of the present invention.

FIG. 18 is a table of backlight evaluation value correction coefficients according to the focal length that is referred to using the smallest geometric data and the focal length data of the photographic lens according to Embodiment 6 of the present invention.

DETAILED DESCRIPTION OF THE INVENTION

Preferred embodiments of the present invention will be described hereinafter with reference to the drawings.

Embodiment 1

First, Embodiment 1 of the present invention is described.

Figure 1:
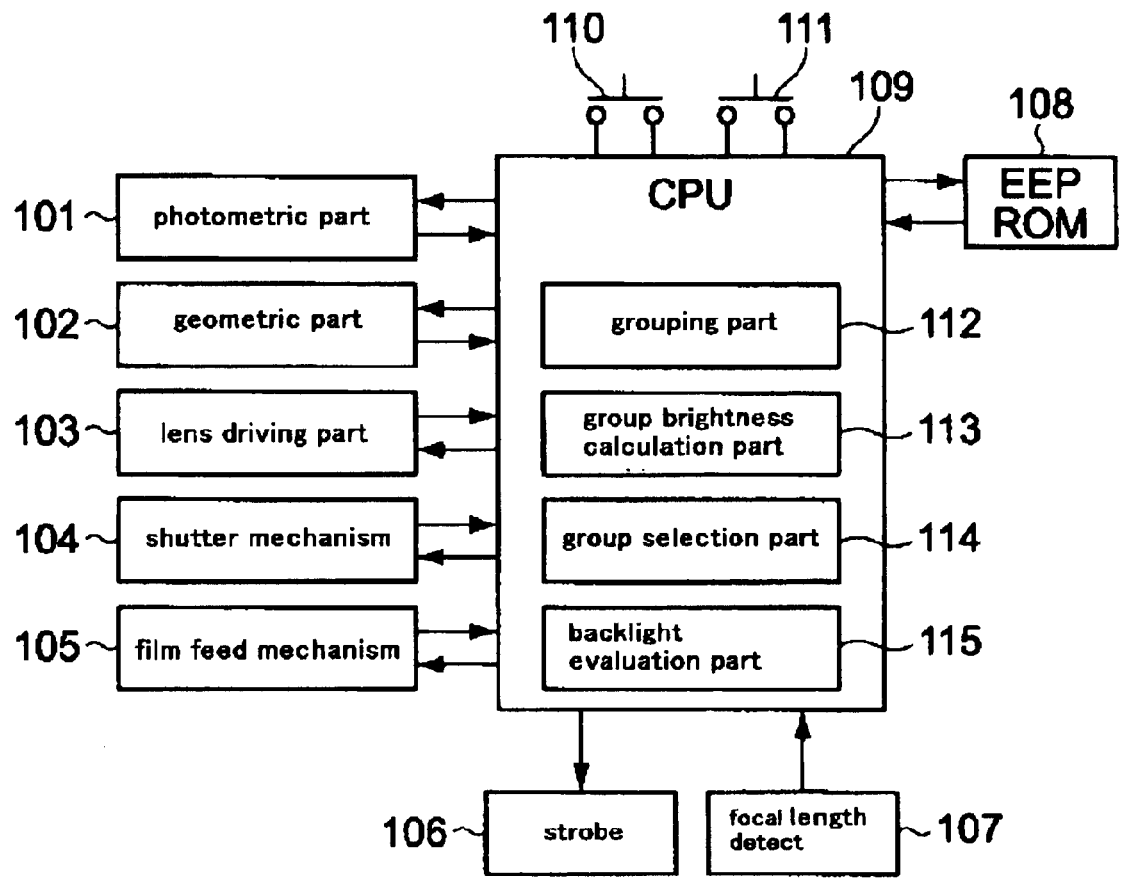
FIG. 1 is an illustration to show the schematic configuration of a camera in which the photometric apparatus according to embodiments of the present invention is installed.

FIG. 1 shows the schematic configuration of a camera in which the photometric apparatus of the present invention is installed. Among them, a photometric part 101, a geometric part 102, and a CPU 109 are described in detail later.

The photometric part 101 measures the brightness of a subject in the photographic frame. The geometric part 102 measures the distance to the subject in the photographic frame. A lens driving part 103 drives a focus control lens of the photographic lens (not shown) based on the distance information obtained by the geometric part 102. The lens driving part 103 comprises, for example, a gear for driving the focus control lens provided in the photographic lens barrel, a small motor for rotating the gear, and a circuit for driving the motor.

A shutter mechanism 104 is used to expose the film and comprises, for example, a shutter diaphragm, a mechanism for opening and closing the shutter diaphragm, and a circuit for controlling the mechanism. A film feed mechanism 105 is used to wind and rewind the film and comprises, for example, a gear for driving the film, a small motor for rotating the gear, and a circuit for driving the motor. A strobe 106 is used to illuminate the subject when there is a low level brightness or a backlight. A focal point detection mechanism 107 detects the focal point distance of the photographic lens and comprises, for example, a photo-interrupter for detecting the rotation of a motor for driving a focal point adjuster lens and a counter for counting rectangular waves from the photo-interrupter. A non-volatile memory 108 is used to store the various settings and control values and it is, for example, an EEPROM.

A first release (1R) switch 110 is used to direct the camera to measure and calculate geometric and photometric data regarding the subject that are necessary for photography. A second release (2R) switch 111 is used to direct the camera to take a picture based on the subject information that is measured and calculated after the 1R switch is turned on. These elements are connected to the CPU 109 that performs sequence controls and operations for the entire camera. The CPU 109 is controlled by programs and comprises, as parts having functions regarding the present invention, a grouping part 112, a group brightness calculation part 113, a group selection part 114, and the backlight evaluation part 115. Each functional part can be realized by a corresponding program part (for example, subroutine) that runs on the CPU 109 or each functional part can be realized by an individual program or circuit.

The grouping part 112 groups plural geometric areas in the photographic frame based on the geometric data. The group brightness calculation part 113 calculates the average photometric measurement of each geometric area group that is formed by the grouping part 112. The group selection part 114 selects a group that includes the smallest distance data among the groups formed by the grouping part 112. The backlight evaluation part 115 evaluates backlight based on the difference in brightness between the group selected by the group selection part 114 and the other groups.

Figure 2:
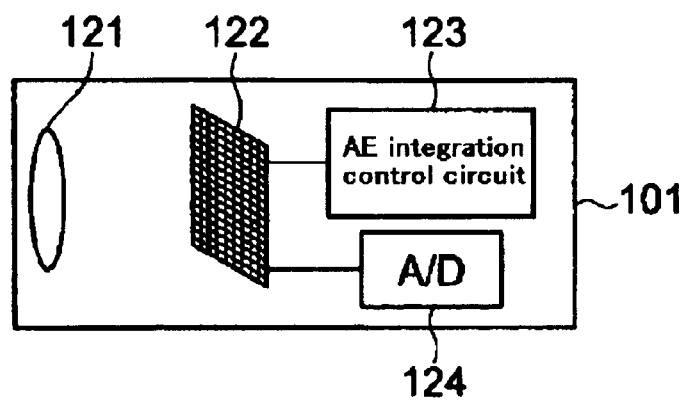
FIG. 2 is an illustration to show the photometric part of Embodiments 1 to 6 of the present invention.

The photometric part 101 is now explained with reference to FIG. 2. A photometric lens 121 is used for guiding the light components in the photographic frame to a multiple division photometric sensor 122. The multiple division photometric sensor 122 has a plurality of divided photometric areas for receiving light components in the photographic frame that are guided by the photometric lens 121. For example, a CMOS or CCD imager is used for this. Photoelectric currents produced in the respective photometric areas of the multiple division photometric sensor 122 are stored in junction capacitors of the pixels and integrated. A photometric integration control circuit 123 controls the integration operation of the multiple division photometric sensor 122. It provides control pulses to the multiple division photometric sensor 122 to control the start, stop, reset, and readout of the integration. An A/D conversion circuit 124 performs A/D conversion of the integration output from the multiple division photometric sensor 122. The multiple division photometric sensor 122, integration control circuit 123, and A/D conversion circuit 124 together comprise a photometric circuit.

After passing through the photometric lens 121, light from the subject falls on the multiple division photometric sensor 122. Photoelectric currents are produced and integrated in the multiple division photometric sensor 122 in accordance with the incident light intensity. The photometric integration control circuit 123 outputs the integration result of each photometric area, which is then digitalized by the A/D conversion circuit 124.

Figure 3:
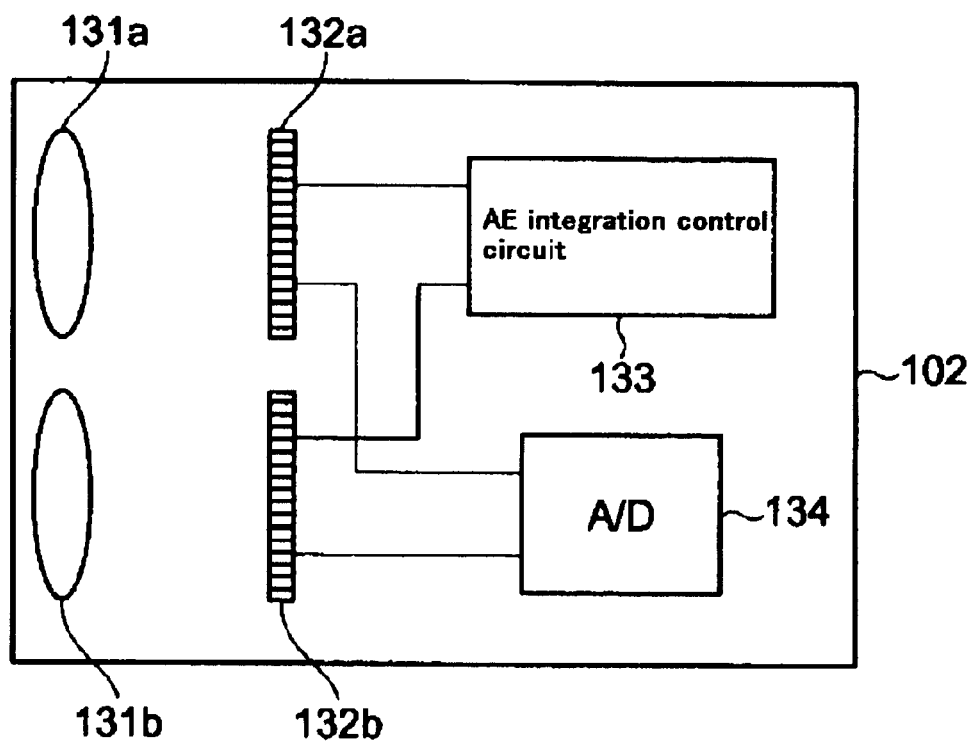
FIG. 3 is an illustration to show the geometric part of Embodiments 1 to 6 of the present invention.

The geometric part 102 is now described with reference to FIG. 3. A light receiving lens 131a is used to form an image of the subject on a line sensor 132a and a light receiving lens 131b is used to form an image of the subject on a line sensor 132b. The line sensors 132a and 132b perform a photoelectric conversion of the images formed by the light receiving lenses 131a and 131b to produce electric signals in accordance with their light intensity. The electric signals are integrated as in the photometric part 101. A geometric integration circuit 133 controls integration operations of the line sensors 132a and 132b. It provides control pulses to the line sensors 132a and 132b to control the start, stop, reset, and readout of the integration. An A/D conversion circuit 134 performs A/D conversion of the integration output from the line sensors 132a and 132b. The line sensors 132a and 132b, geometric integration control circuit 133, and A/D conversion circuit 134 together comprise a geometric circuit.

After passing through the light receiving lenses 131a and 131b, light from the subject forms an image on the line sensors 132b and 132a, respectively. Photoelectric currents produced by this light are integrated under the control of the geometric integration control circuit 133 and the integration result is digitalized by the A/D conversion circuit 134. The distance between the images on the line sensors 132a and 132b provides the distance to the subject. The geometric measurement is obtained for each geometric area.

Figure 4:
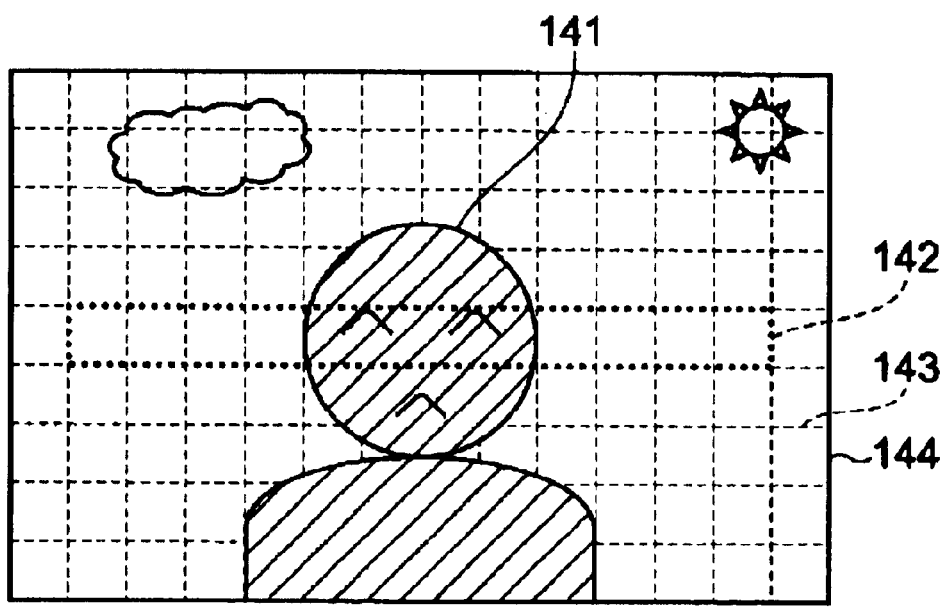
FIG. 4 is an illustration to show a picture in backlight and how to divide the photometric and geometric areas in a photographic frame.

FIG. 4 shows how to define the photometric and geometric areas in the photographic frame. A photographic frame 144 contains a person 141 in backlight as a main subject. The photographic frame 144 is divided into a plurality of photometric areas by photometric area boundaries 143 (vertically 9, horizontally 14, a total of 126 photometric areas in this embodiment). The photometric measurement is obtained for each photometric area. The photographic frame 144 also includes a geometric range 142 marked by thick dotted lines that is divided into a plurality of geometric areas (12 geometric areas in this embodiment). The geometric measurement is obtained for each geometric area. In this embodiment, the photometric and geometric areas have the same size and they are aligned. This is not essential. It is sufficient that the photometric and geometric areas correspond to each other. The photometric part 101 performs the photometry for each photometric area and, then, the geometric part 102 performs the geometry for the geometric range 142 enclosed by the thick dotted lines.

Figures 5, 6:
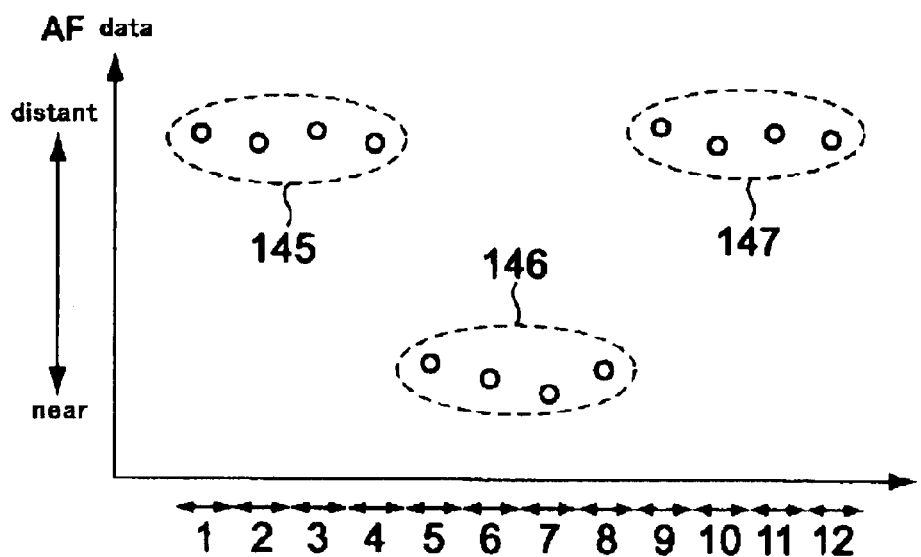
FIG. 5 is a graphical representation to show the grouping according to the distance to a subject shown in Embodiment 1 of the present invention.
FIG. 6 is a table of backlight evaluation values that is referred to using the number of geometric areas composing the smallest distance group and the middle geometric area number.

FIG. 5 shows the result of grouping the plotted object distance measurements in the frame of FIG. 4. The geometric area is plotted as abscissa and the numbers 1 to 12 indicates the geometric areas within the geometric range 142. The distance measurement is plotted as ordinate. The distance measurement of each geometric area is plotted as a white circle.

Measurement groups 145 and 147 correspond to the background in FIG. 4 and measurement group 146 corresponds to the person in FIG. 4. The group 146 includes the smallest geometric measurement (geometric measurement of the geometric area 7) and, therefore, is the smallest distance group. The groups 145 and 147 are comprised of the geometric areas that are not included in the smallest distance group 146. The group 146 is comprised of adjacent geometric areas, the geometric data which have a certain range of deviation from the smallest geometric data.

The geometric range 142 is divided into 12 small areas (geometric area) shown in FIG. 5. The geometric data is obtained for each geometric area. The distance profile in FIG. 5 is obtained for the scene shown in FIG. 4. The distance profile is used to determine the smallest distance group, or the group 146, that includes the smallest distance data and the data having a certain range of deviation from the smallest distance data and other groups, or the groups 145 and 147, comprising of geometric areas not included in the group 146.

Here, the number of geometric areas comprising of the smallest distance group 146 and the middle geometric area are obtained. In the case of FIG. 5, the number of geometric areas is 4 and the middle geometric area is 6 or 7.

FIG. 6 is a table of backlight evaluation values for selecting a reference for evaluating the backlight (backlight evaluation value) that is referred to using the number of geometric areas comprising the smallest distance group and the middle geometric area number thereof. The number of geometric areas and the middle geometric area are used to refer to the table for the backlight evaluation value. In the case of FIG. 5, the number of geometric areas is 4 and the middle geometric area is 6 or 7. Therefore, the backlight evaluation value is 1 EV.

Null data cells indicate that there are no such combinations or no backlight evaluation. Instead of using a table as is shown in FIG. 6, the backlight evaluation value can be calculated by a linear or higher order expression using the number of geometric areas, the middle geometric area, and a certain coefficient.

The backlight evaluation value is compared with the difference (B–A) between the average photometric measurement A among the photometric areas that correspond to the geometric areas included in the smallest distance group 146 and the average photometric measurement B among other photometric areas. If the backlight evaluation value is smaller, the backlight is confirmed and the average photometric measurement of the smallest distance group 146 is used as a photometric data for the exposure calculation. On the contrary, if the evaluation value is larger, the average photometric measurement among all the photometric areas is calculated and used as a photometric data for the exposure calculation.

Here, the backlight evaluation value is smaller when the smallest distance group 146 includes more geometric areas and the middle geometric area is closer to the center of the photographic frame. This is because a major subject likely occupies more area in the photographic frame and is closer to its center. Therefore, such a subject is more likely to undergo backlight evaluation. On the other hand, adjuncts likely occupy smaller areas in the photographic frame and are located away from its center, which does not undergo the backlight evaluation. This prevents inappropriate exposure adjustment mistakenly done with an adjunct, and not with the main subject. In the embodiment above, the geometric part 102 uses line sensors for one-dimension geometry. However, a line sensor can be replaced with an area sensor for two-dimensional geometry. Embodiment 1 of the present invention not only ensures the proper exposure for the main subject in the backlight, but also prevents improper exposure mistakenly done with surrounding adjuncts in the photographic frame.

Figure 7:
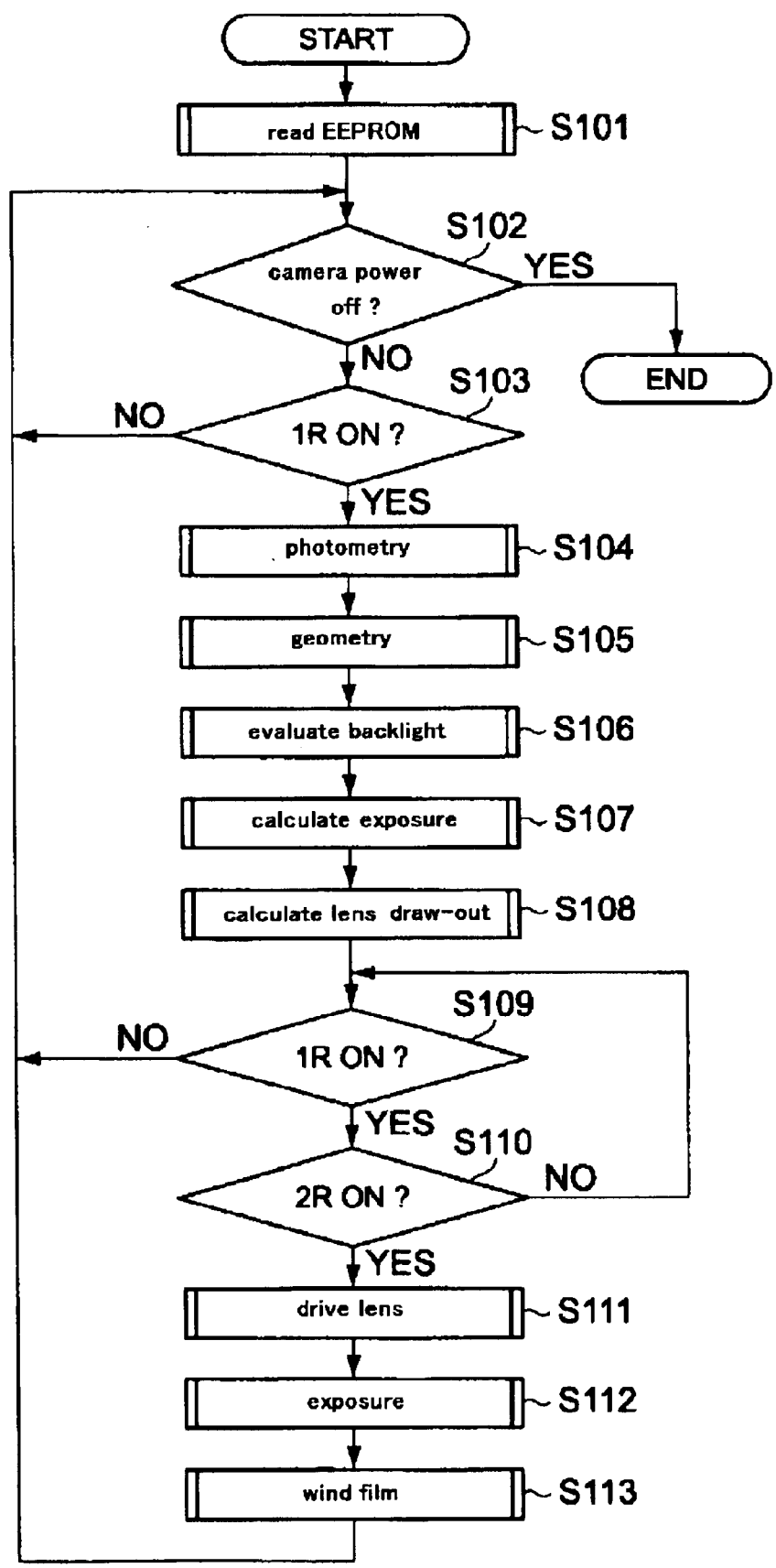
FIG. 7 is a flowchart of the release sequence procedure of a camera in which the photometric apparatus of the present invention is installed.

FIG. 7 is a flowchart of the release sequence procedure performed by the CPU of a camera in which the photometric apparatus of the present invention is installed. First, when a not-shown power switch of the camera is turned on, the CPU 109 reads various settings and control values from the non-volatile memory such as an EEPROM and loads them on a RAM of the CPU 109, at step S101. The CPU 109 ends the release sequence if the not-shown power switch of the camera is OFF, at step S102. If it is ON, the CPU 109 goes to step S103. At step S103, the CPU 109 goes to step S104 if the 1R switch 110 is ON or it returns to step S102 if it is OFF.

At step S104, the photometric part 101 of the CPU 109 performs photometry in which the photometric measurements of the respective photometric areas in the photographic frame are calculated. Then, at step S105, the geometric part 102 of the CPU 109 performs geometry in which geometric measurements of the respective geometric areas in the photographic frame are calculated. Thus, the distance data are obtained in step S105. (The geometric part 102 can be referred to as a ranging part that performs ranging in the geometric range 142 of FIG. 4. As shown in FIG. 5, the geometric range 142 is divided into 12 small areas, and the geometric data or the distance data are obtained for each of the areas.) At step S106, the CPU 109 performs the backlight evaluation based on the subject brightness profile derived from the measurements of step S104 and the subject distance profile derived from the measurements of step S105. The backlight evaluation is described above with reference to FIGS. 5 and 6. At step S107, the CPU 109 calculates exposure based on the exposure calculation data given at the backlight evaluation at step S106 and outputs an exposure control data. At step S108, the CPU 109 calculates the draw-out magnitude of a not-shown focus control lens based on the subject distance data obtained at step S107.

At step S109, the CPU 109 goes to step S110 if the 1R switch 110 is ON or it returns to step S102 if it is OFF. At step S110, the CPU 109 goes to step S111 if the 2R switch 111 is ON or it returns to step S109 if it is OFF. At step S111, the CPU 109 uses the lens driving mechanism 103 to draw out a not-shown focus control lens in accordance with the draw-out magnitude obtained at step S108. At step S112, the CPU 109 uses the shutter mechanism 104 for an exposure in accordance with the exposure control data obtained at step S107. At step S113, the CPU 109 uses the film feed mechanism 105 to wind the film by a frame and then returns to step S102.

Figure 8:
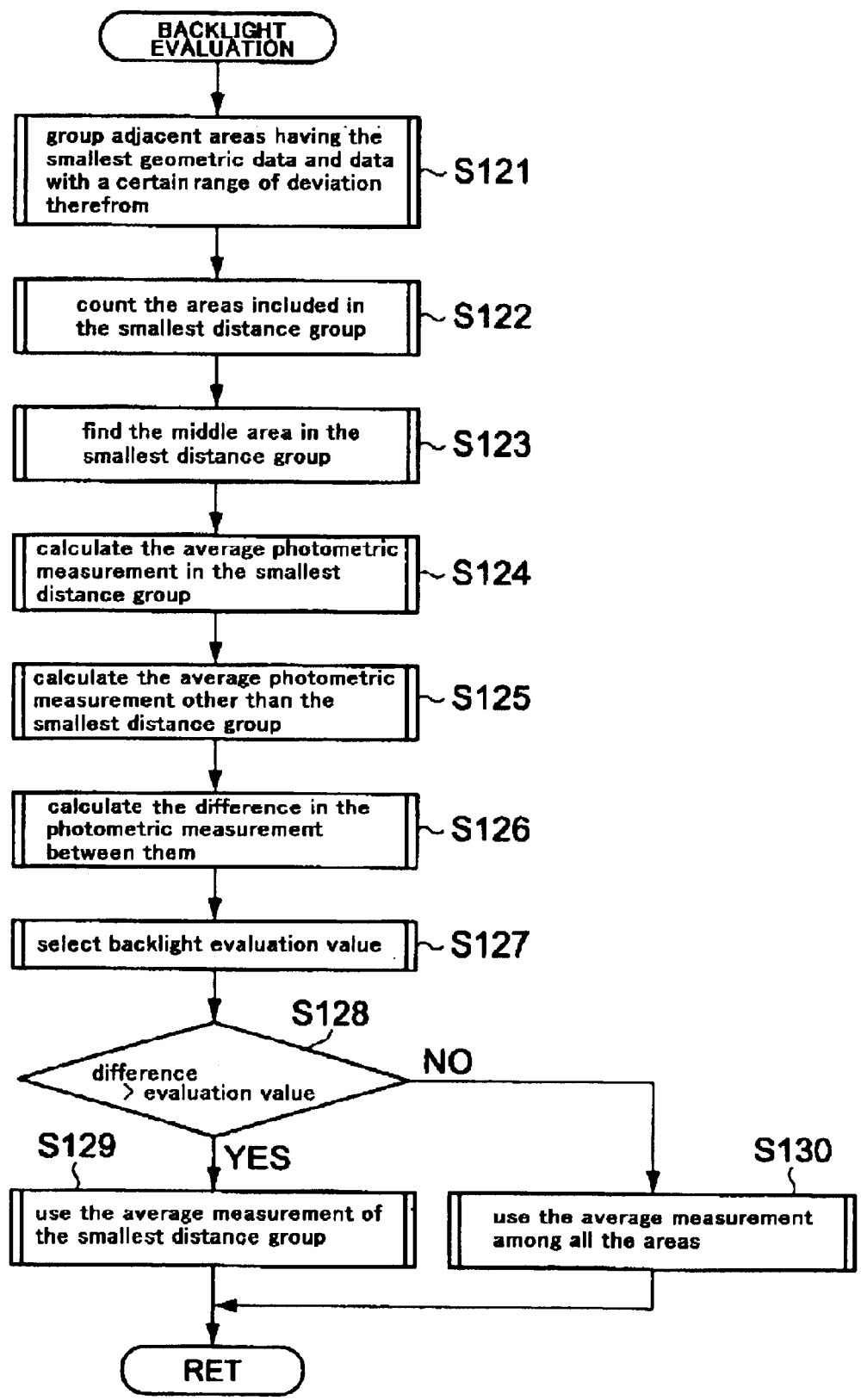
FIG. 8 is a flowchart of the procedure to evaluate the backlight according to Embodiment 1 of the present invention.

FIG. 8 is a flowchart of the procedure to evaluate the backlight according to Embodiment 1 of the present invention. Here, step S106 of the flowchart in FIG. 7 is described in detail. At step S121, the CPU 109 finds the smallest geometric data among the geometric data of the respective geometric areas in the photographic frame that are obtained at step S105 in FIG. 7. It further groups adjacent geometric areas having the smallest geometric data and geometric data with a certain range of deviation therefrom. At step S122, the CPU 109 counts the geometric areas included in the smallest distance group formed at step S121. At step S123, the CPU 109 finds the middle geometric area in the smallest distance group formed at step S121. At step S124, the CPU 109 calculates the average photometric measurement among the photometric areas corresponding to the smallest distance group formed at step S121. At step S125, the CPU 109 calculates the average photometric measurement among the photometric areas not corresponding to the smallest distance group formed at step S121. At step S126, the CPU 109 calculates the difference between the average photometric measurement of the smallest distance group obtained at step S124 and the average photometric measurement among the photometric areas excluded from the smallest distance groups that is obtained at step S125. At step S127, the CPU 109 refers to the table shown in FIG. 6 using the number of geometric areas and middle geometric area number obtained at steps S122 and S123 to obtain the backlight evaluation value. At step S128, the CPU 109 compares the difference in average photometric measurement obtained at step S126 with the backlight evaluation value obtained at step S127. If the difference in average photometric measurement is larger than the backlight evaluation value, the CPU 109 goes to step S129. If smaller, the CPU 109 goes to step S130. At step S129, the CPU 109 sets the exposure calculation data for the average photometric measurement of the smallest distance group obtained at step 124. At the 130, the CPU 109 sets the exposure calculation data for the average photometric measurement among all the photometric areas.

In Embodiment 1, the CPU 109 selects the smallest distance group in the photographic frame based on the geometry result and evaluates the backlight by comparing the geometry result of the smallest distance group with that of the other groups in the photographic frame for exposure control. More precisely, the size and position of the smallest distance group in the photographic frame is considered to obtain the backlight evaluation value. The CPU 109 then compares the difference in photometric measurement between the smallest distance group and the other groups with the backlight evaluation value to evaluate the backlight. When it confirms backlight, the CPU 109 calculates the exposure based on the photometric measurement of the smallest distance group. If not, it calculates the exposure based on the photometric measurement of the entire photographic range.

Embodiment 2

Embodiment 2 of the present invention is hereinafter described. In the same configuration as Embodiment 1, Embodiment 2 uses the maximum photometric measurement for the backlight evaluation while Embodiment 1 uses the average photometric measurement among the areas excluded from the smallest distance group. This is for preventing the improper exposure of the main subject in the case where the backlight is not confirmed despite the fact that the main subject is in backlight, because of a large, less bright background. Embodiment 2 ensures photographing with proper exposure for the subject even if the subject is in the backlight with a large, less bright background. Similar explanation to Embodiment 1 is not repeated.

Figure 9:
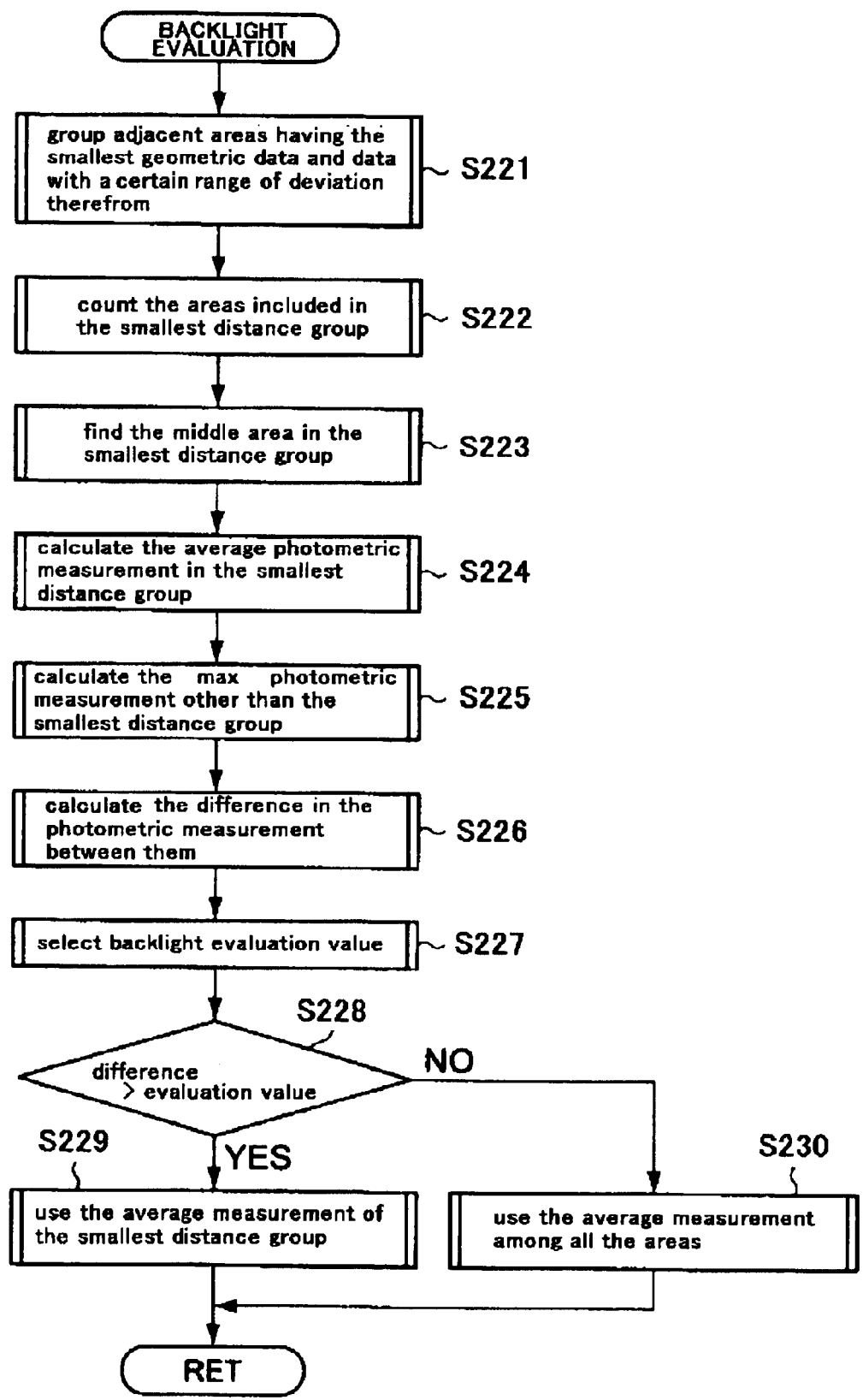
FIG. 9 is a flowchart of the procedure to evaluate the backlight according to Embodiment 2 of the present invention.

FIG. 9 is a flowchart of the procedure to evaluate the backlight according to Embodiment 2 of the present invention. As is shown in FIG. 9, at step S221, the CPU 109 finds the smallest geometric data among geometric data of the respective geometric areas in the photographic frame measured at step S105 and it groups the adjacent geometric areas having the smallest distance data and the geometric data with a certain range of deviation therefrom. At step S222, the CPU 109 counts the geometric areas included in the smallest distance group formed at step S221. At step S223, the CPU 109 finds the middle geometric area number in the smallest distance group formed at step S221.

At step S224, the CPU 109 calculates the average photometric measurement among the photometric areas corresponding to the smallest distance group formed at step S221. At step S225, the CPU 109 selects the maximum photometric measurement among the photometric data of the photometric areas excluded from the smallest distance group formed at step S221. At step S226, the CPU 109 calculates the difference between the average photometric measurement of the smallest distance group obtained at step S224 and the maximum photometric measurement among the photometric areas excluded from the smallest distance group that is selected at step S225. At step S227, the CPU 109 refers to the table shown in FIG. 6 using the number of geometric areas and the middle geometric area number obtained at steps S222 and S223 to obtain the backlight evaluation value. At step S228, the CPU 109 compares the difference between the average photometric measurement and the maximum photometric measurement obtained at step S226 with the backlight evaluation value obtained at step S227. If the difference between the average photometric measurement and the maximum photometric measurement is larger than the backlight evaluation value, the CPU 109 goes to step S229. If it is smaller, the CPU 109 goes to step S230.

At step S229, the CPU 109 sets the exposure calculation data for the average photometric measurement of the smallest distance group obtained at step S224. At step 230, the CPU 109 calculates the average photometric measurement among all the photometric areas and sets the exposure calculation data for it.

Embodiment 2 uses the maximum measurement, not the average, to evaluate the photographic range except for the smallest distance group. This ensures proper exposure even if the main subject has a large, less bright background.

Embodiment 3

Embodiment 3 of the present invention is hereinafter described. In the same configuration as Embodiment 1, Embodiment 3 uses a strobe emission on exposure while Embodiment 1 involves exposure control based on the average photometric measurement of the smallest distance group 146 when the backlight is confirmed. This is for ensuring proper exposure of the main subject by means of the strobe emission and for the background by means of exposure time. Embodiment 3 ensures photographing with proper exposure not only for the subject but also for the background in the backlight. An explanation similar to Embodiment 1 is not repeated.

Figure 10:
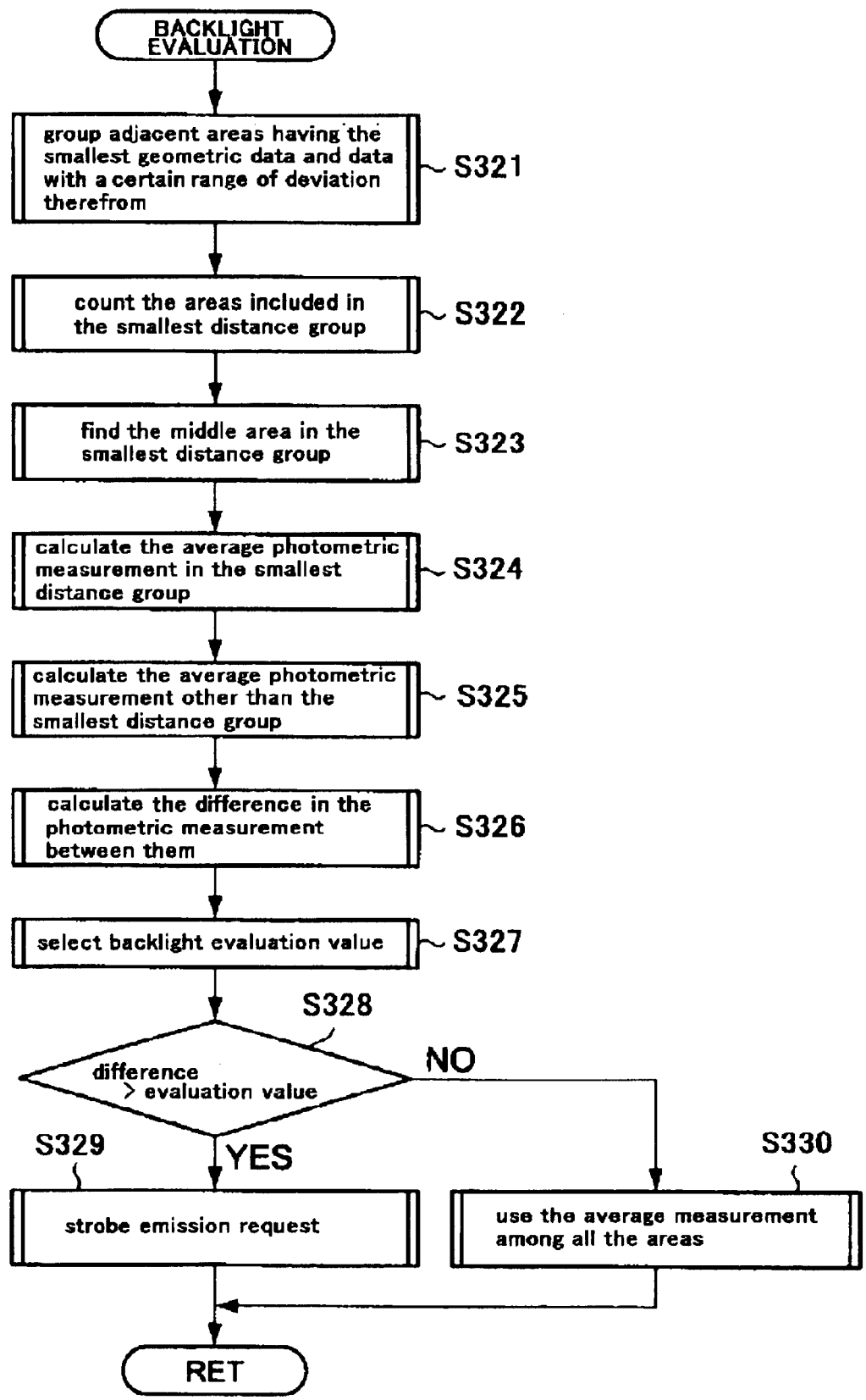
FIG. 10 is a flowchart of the procedure to evaluate the backlight according to Embodiment 3 of the present invention.

FIG. 10 is a flowchart of the procedure to evaluate the backlight according to Embodiment 3 of the present invention. As is shown in FIG. 10, at step S321, the CPU 109 finds the smallest geometric data among geometric data of the respective geometric areas in the photographic frame measured at step S105 and groups adjacent geometric areas having the smallest geometric data and geometric data with a certain range of deviation therefrom to form the smallest distance group. At step S322, the CPU 109 counts the geometric areas included in the smallest distance group formed at step S321. At step S323, the CPU 109 finds the middle geometric area number in the smallest distance group formed at step S321. At step S324, the CPU 109 calculates the average photometric measurement among the photometric areas corresponding to the smallest distance group formed at step S321. At step S325, the CPU 109 calculates the average photometric data among the photometric areas not corresponding to the smallest distance group formed at step S321.

At step S326, the CPU 109 calculates the difference between the average photometric measurement of the smallest distance group obtained at step S324 and the average photometric measurement among the photometric areas excluded from the smallest distance group that is obtained at step S325. At step S327, the CPU 109 refers to the table shown in FIG. 6 using the number of geometric areas and middle geometric area number obtained at steps S322 and S323 to obtain the backlight evaluation value. At step S328, the CPU 109 compares the difference in the average photometric measurements obtained at step S326 with the backlight evaluation value obtained at step S327. If the difference in average photometric measurement is larger than the backlight evaluation value, the CPU 109 goes to step S329. If smaller, the CPU 109 goes to step S330. At step S329, the CPU 109 sets a strobe emission request by, for example, setting a strobe emission request flag. Then, at step 330, the CPU 109 calculates the average photometric measurement among all the photometric areas and sets the exposure calculation data for it.

Embodiment 3 uses a strobe emission when the backlight is confirmed. This ensures the proper exposure for the main object but also for the background in backlight.

Embodiment 4

Embodiment 4 of the present invention is hereinafter described. Embodiment 3 uses a strobe emission on exposure when the backlight is confirmed. However, a strobe emission may not be useful in some cases such as where the photographic lens has a large F number, the subject is at a far distance, and the film has a low sensitivity. In the same configuration as Embodiment 1, Embodiment 4 determines whether the strobe emission is useful or not when the backlight is confirmed. If it is not useful, exposure is controlled based on the average photometric measurement of the smallest distant group 146. Embodiment 4 ensures the proper exposure for the main subject in the backlight where the strobe emission is not useful. An explanation similar to Embodiment 1 is not repeated.

Figure 11:
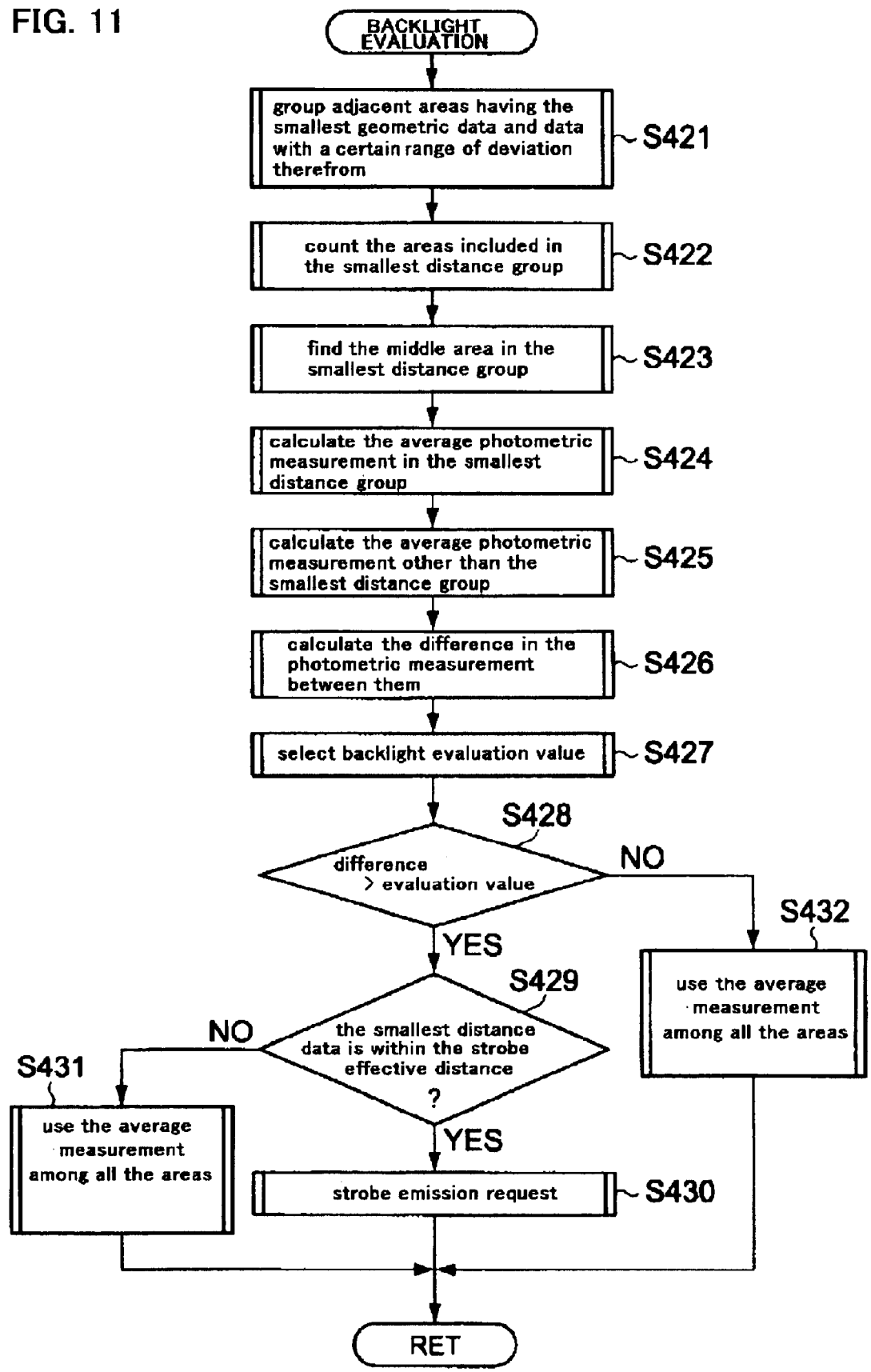
FIG. 11 is a flowchart of the procedure to evaluate the backlight according to Embodiment 4 of the present invention.

FIG. 11 is a flowchart of the procedure to evaluate the backlight according to Embodiment 4 of the present invention.

As is shown in FIG. 11, at step S421, the CPU 109 finds the smallest geometric data among geometric data of the respective geometric areas in the photographic frame measured at step S105 and groups the adjacent geometric areas having the smallest geometric data and geometric data with a certain range of deviation therefrom to form the smallest distance group. At step S422, the CPU 109 counts the geometric areas included in the smallest distance group formed at step S421. At step S423, the CPU 109 finds the middle geometric area number in the smallest distance group formed at step S421. At step S424, the CPU 109 calculates the average photometric measurement among the photometric areas corresponding to the smallest distance group formed at step S421. At step S425, the CPU 109 calculates the average photometric measurement among the photometric areas not corresponding to the smallest distance group formed at step S421. At step S426, the CPU 109 calculates the difference between the average photometric measurement of the smallest distance group obtained at step S424 and the average photometric measurement among the photometric areas excluded from the smallest distance group that is obtained at step S425.

At step S427, the CPU 109 refers to the table shown in FIG. 6 using the number of geometric areas and middle geometric area number obtained at steps S422 and S423 to obtain the backlight evaluation value. At step S428, the CPU 109 compares the difference in the average photometric measurements obtained at step S426 with the backlight evaluation value obtained at step S427. If the difference in the average photometric measurement is larger than the backlight evaluation value, the CPU 109 goes to step S429. If smaller, the CPU 109 goes to step S432. At step S429, the CPU 109 determines whether the smallest geometric data obtained at step S421 is within the strobe effective distance based on the F number of the photographic lens and the film sensitivity. The CPU 109 reads data stored in an IC memory of the photographic lens barrel to obtain the F number of the photographic lens. It also electrically reads the data displayed on the outer case of the film to obtain the film sensitivity. The CPU 109 goes to step S430 if the smallest geometric data is within the strobe effective distance. If not, the CPU 109 goes to step S431. The average geometric data or the largest geometric data of the smallest distance group can be used in place of the smallest geometric data.

At step S430, the CPU 109 sets a strobe emission request by, for example, setting a strobe emission request flag. At step S431, the CPU 109 sets the exposure calculation data for the average photometric data of the smallest distance group obtained at step S424. At step 432, the CPU 109 calculates the average photometric measurement among all the photometric areas and sets the exposure calculation data for it.

Embodiment 4 uses the F number of the camera and the film sensitivity to determine whether a strobe emission is useful. This ensures more appropriate strobe emission.

Embodiment 5

Embodiment 5 of the present invention is hereinafter described. In the same configuration as Embodiment 1, Embodiment 5 performs a correction of the backlight evaluation value after it is obtained by referring to the table in FIG. 6 in which the evaluation value is multiplied by a coefficient as is shown in FIG. 16 in accordance with a geometric data of the smallest distance group 146 (the average geometric data, the smallest geometric data). The corrected evaluation value is obtained by T×KL in which T is the evaluation value obtained from the table in FIG. 6 and KL is a coefficient in accordance with the geometric data. This is for preventing the misjudged backlight when a low brightness subject is present at a distance. The coefficient KL corresponding to the geometric data can be calculated by a linear or higher order function using the geometric data and a certain coefficient instead of having a data table shown in FIG. 16. Embodiment 5 prevents the misjudged backlight that leads to improper exposure for the entire photographic frame when the subject is at a distance. An explanation similar to Embodiment 1 is not repeated.

Figure 12:
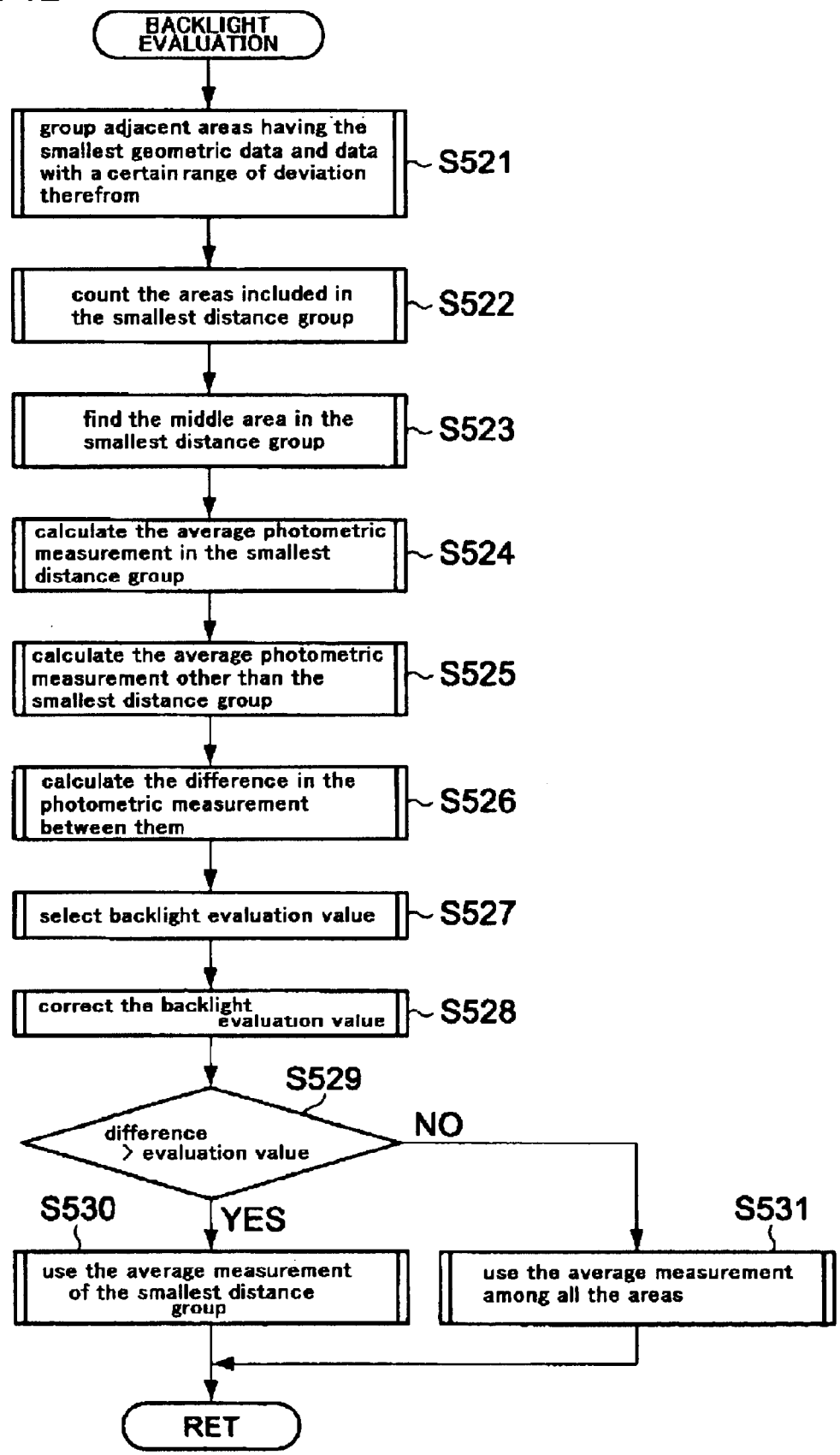
FIG. 12 is a flowchart of the procedure to evaluate the backlight according to Embodiment 5 of the present invention.

FIG. 12 is a flowchart according to Embodiment 5 of the present invention. As is shown in FIG. 12, at step S521, the CPU 109 finds the smallest geometric data among geometric data of the respective geometric areas in the photographic frame measured at step S105 and groups the adjacent geometric areas having the smallest geometric data and geometric data with a certain range of deviation therefrom to form the smallest distance group. At step S522, the CPU 109 counts the geometric areas included in the smallest distance group formed at step S521. At step S523, the CPU 109 finds the middle geometric area number in the smallest distance group formed at step S521. At step S524, the CPU 109 calculates the average photometric measurement among the photometric areas corresponding to the smallest distance group formed at step S521. At step S525, the CPU 109 calculates the average photometric measurement among the photometric areas not corresponding to the smallest distance group formed at step S521.

At step S526, the CPU 109 calculates the difference between the average photometric measurement of the smallest distance group obtained at step S524 and the average photometric measurement among the photometric areas excluded from the smallest distance group that is obtained at step S525. At step S527, the CPU 109 refers to the table shown in FIG. 6 using the number of geometric areas and middle geometric area number obtained at steps S522 and S523 to obtain the backlight evaluation value. At step S528, the CPU 109 refers to the table shown in FIG. 16 using the smallest geometric data obtained at step S521 to select the backlight evaluation value correction coefficient KL and correct the backlight evaluation value. The average geometric data or the largest geometric data of the smallest distance group can be used in place of the smallest geometric data.

At step S529, the CPU 109 compares the difference in average photometric measurement obtained at step S526 with the corrected backlight evaluation value obtained at step S528. If the difference in average photometric measurement is larger than the backlight evaluation value, the CPU 109 goes to step S530. If smaller, the CPU 109 goes to step S531. At step S530, the CPU 109 sets the exposure calculation data for the average photometric measurement of the smallest distance group obtained at step 524. At step 531, the CPU 109 calculates the average photometric measurement among all the photometric areas and sets the exposure calculation data for it.

Embodiment 5 obtains the backlight evaluation value using the distance in the smallest distance group in addition to the position and size of the smallest distance group in the photographic frame. This ensures more appropriate backlight evaluation.

Embodiment 6

Embodiment 6 of the present invention is hereinafter described. In the same configuration as Embodiment 1, Embodiment 6 involves the switching of the tables of the backlight evaluation values between the large and short focal lengths. The table shown in FIG. 6 is used for the small focal length and a table in FIG. 17 is used for the large focal length. After a value is obtained using either one of the tables, the backlight evaluation value is multiplied by a coefficient in FIG. 18 that is determined by the geometric data of the smallest distance group 146 (the average geometric data and the smallest geometric data) and the focal length of the photometric lens in order to correct the evaluation value. The number of tables between which the switching is performed is not confined to two. Three or more tables can be switched depending on the focal length. Null data cells indicate that there are no such combinations or no backlight evaluation. The corrected evaluation value is obtained by T×KLf in which T is the evaluation value obtained from the table in FIG. 6 or 17 and KLf is a coefficient in FIG. 18 in accordance with the geometric data and the focal length of the photographic lens. This is because areas in the photographic frame and the strobe effective distance vary in accordance with the focal length of the photographic lens where photometry and geometry is based on the ambient light as is shown in FIGS. 2 and 3. The coefficient KLf for the geometric data and the focal length of the photometric lens can be calculated by a linear or higher order function using the geometric data and the focal length of the photographic lens and a certain coefficient instead of having a data table shown in FIG. 18. Embodiment 6 ensures the backlight evaluation in accordance with the focal length of the photographic lens. An explanation similar to Embodiment 1 is not repeated.

Figure 13:
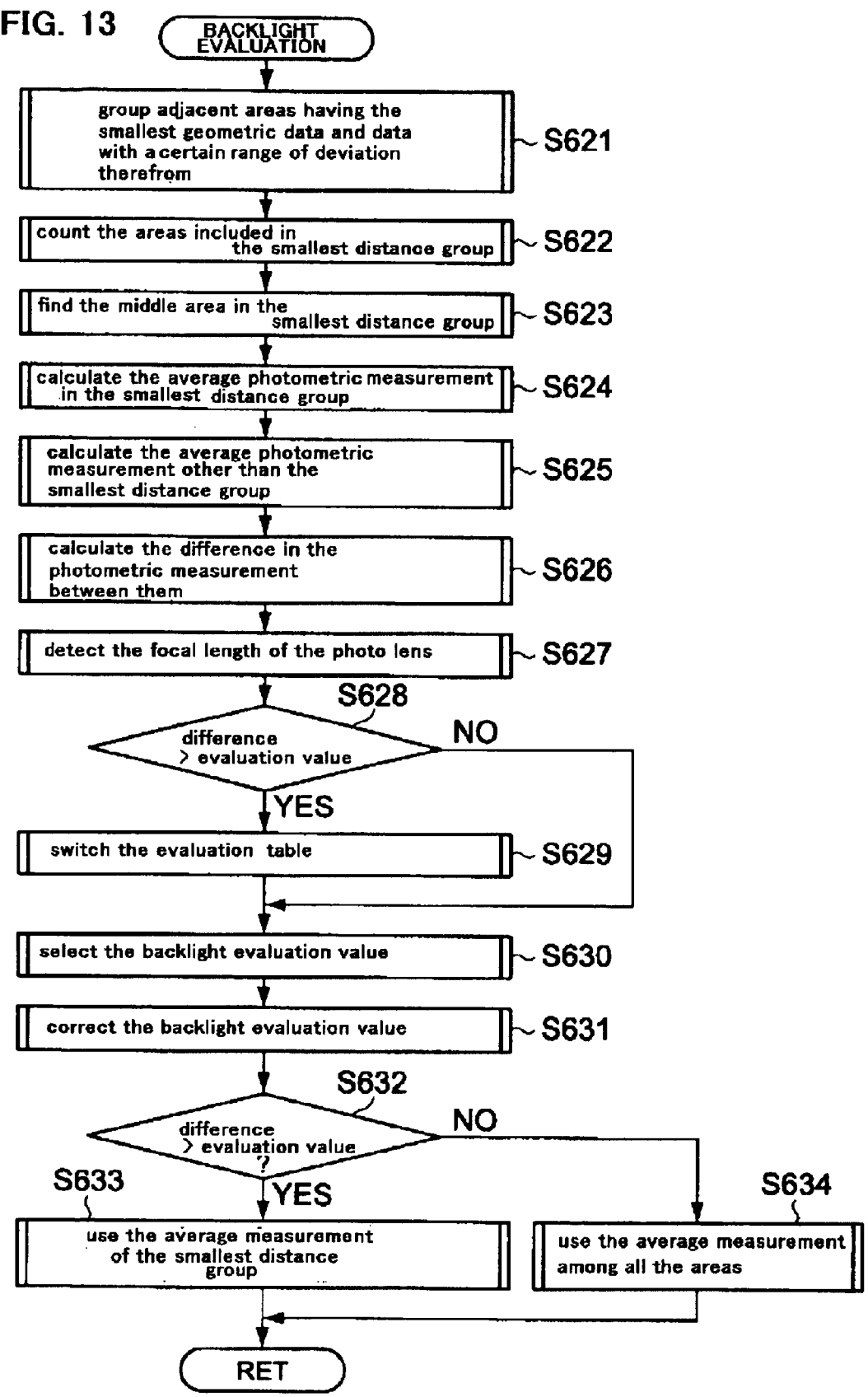
FIG. 13 is a flowchart of the procedure to evaluate the backlight according to Embodiment 6 of the present invention.

FIG. 13 is a flowchart of the procedure to evaluate the backlight according to Embodiment 6 of the present invention. As is shown in FIG. 13, at step S621, the CPU 109 finds the smallest geometric data among the geometric data of the respective geometric areas in the photographic frame measured at step S105 and groups adjacent geometric areas having the smallest geometric data and geometric data with a certain range of deviation therefrom to form the smallest distance group. At step S622, the CPU 109 counts the geometric areas included in the smallest distance group formed at step S621. At step S623, the CPU 109 finds the middle geometric area number in the smallest distance group formed at step 621. At step S624, the CPU 109 calculates the average photometric measurement among the photometric areas corresponding to the smallest distance group formed at step S621. At step S625, the CPU 109 calculates the average photometric measurement among the photometric areas not corresponding to the smallest distance group formed at step S621.

At step S626, the CPU 109 calculates the difference between the average photometric measurement of the smallest distance group obtained at step S624 and the average photometric measurement among the photometric areas excluded from the smallest distance group that is obtained at step S625. Then, at step S627, the CPU 109 detects the focal length of the photographic lens by means of the focal length detection part 107. At step S628, the CPU 109 compares the focal length of the photographic lens detected at step S627 with a certain value. If the focal length of the photographic lens is larger than the certain value, the CPU 109 goes to step S629. If smaller, the CPU 109 goes to step S630. At step S629, the CPU 109 switches the backlight evaluation value table of FIG. 6 to the one in FIG. 16. At step S630, the CPU 109 refers to the table shown in FIG. 6 or 16 using the number of geometric areas and middle geometric area number obtained at steps S622 and S623 to obtain the backlight evaluation value.

At step S631, the CPU 109 refers to the table shown in FIG. 18 using the smallest geometric data obtained at step S621 and the focal length of the photographic lens detected at step S627 to obtain the backlight evaluation value correction coefficient KLf and corrects the backlight evaluation value. The average geometric data or the largest geometric data of the smallest distance group can be used in place of the smallest geometric data. The F number of the photographic lens or the film sensitivity can be also used to determine the backlight evaluation value correction coefficient KLf in addition to the geometric data and the focal length of the photographic lens. At step S632, the CPU 109 compares the difference in average photometric measurement obtained at step S626 with the corrected backlight evaluation value obtained at step S630. If the difference in average photometric measurement is larger than the backlight evaluation value, the CPU 109 goes to step S633. If smaller, the CPU 109 goes to step S634. At step S633, the CPU 109 sets the exposure calculation data for the average photometric measurement of the smallest distance group obtained at step 624. At step 634, the CPU 109 calculates the average photometric measurement among all the photometric areas and sets the exposure calculation data for it.

Embodiment 6 obtains the backlight evaluation value using the current focal length of the photographic lens and the distance to the smallest distance group in addition to the position and size of the smallest distance group in the photographic frame. This ensures more appropriate backlight evaluation.

Embodiment 7

FIG. 14 is an illustration to explain Embodiment 7 of the present invention. As is shown in FIG. 14, the geometric part 102 of Embodiment 7 has a structure including a pair of area sensors shown in FIG. 13, one of which is also used for photometry. This allows Embodiment 7 to perform two-dimensional area selection while Embodiment 1 performs one-dimensional area selection. The same backlight evaluation process is used except for dimensional differences. Therefore, an explanation is not repeated.

Light receiving lenses 731*a* and 731*b* are used to form images of the subject on area sensors 732*a* and 732*b*. The area sensors 732*a* and 732*b* perform photo-electro conversion of the subject images formed by the light receiving lenses 731*a* and 731*b* and produce electric signals in accordance with their light intensities. An integration control circuit 733 controls the integration operations of the area sensors 732*a* and 732*b*. An A/D conversion circuit 734 reads photometric data or subject image signals from the area sensors 732*a* and 732*b* for A/D conversion. The photometric and geometric part 735 measures the brightness of the subject and subject image. The area sensor 732*a* and 732*b*, integration control circuit 733, A/D conversion circuit 734 compose the photometric and geometric circuit.

Embodiment 7 of the present invention excludes a dedicated photometric part 101 and parallax in photometric and geometric fields of sight. This provides a spatial merit and a photometric apparatus with highly precise backlight evaluation.

Embodiment 8

FIG. 15 is an illustration to explain Embodiment 8 of the present invention. As is shown in FIG. 15, the geometric part 102 has a structure including a pair of area sensors as is shown in FIG. 14, one of which is also used for photometry. An explanation similar to Embodiment 7 is not repeated.

The light receiving lenses 831*a* and 831*b* are used to form images of the subject on the area sensors 832*a* and 832*b*. The area sensors 832*a* and 832*b* perform photo-electro conversion of the subject images formed by the light receiving lenses 831*a* and 831*b* and produce electric signals in accordance with their light intensities. An integration control circuit 833 controls the integration operations of the area sensors 832*a* and 832*b*. An A/D conversion circuit 834 reads the photometric data or subject image signals from the area sensors 832*a* and 832*b* for A/D conversion. The photometric and geometric part 835 measures the brightness of the subject and subject image. An environmental light elimination circuit 836 eliminates environmental light components that steadily enter the area sensors 832*a* and 832*b* from the subject. An emission circuit 837 emits a geometric signal light to the subject.

The geometric part 102 has the environmental light elimination circuit 836 for eliminating environmental light components that steadily enter the area sensors 832*a* and 832*b* from the subject. Two modes are available: the passive mode in which only environmental light components are integrated without eliminating them and the active mode in which the emission circuit 837 emits signal light to the subject and light components reflected on the subject are integrated after eliminating environmental light. The passive mode integration is used in photometry and either mode is selected for geometry depending on the subject conditions (for example, the passive mode is selected for the subject with high brightness and high contrast and the active mode for the subject with low brightness and low contrast).

Embodiment 8 of the present invention improves geometric precision in addition to providing a similar effect as in Embodiment 7.

While it has been shown and described what is considered to be the preferred embodiments of the present invention, it will, of course, be understood that various modifications and changes in form or detailed could readily be made without departing from the spirit of the invention. It is therefore intended that the invention be not limited to the exact forms described and illustrated, but should be constructed to cover all modifications that may fall within the scope of the appended claims.

What is claimed is:

1. A photometric backlight evaluation apparatus comprising:

a photometric circuit for measuring a brightness of a subject in a plurality of areas of a photographic frame;

a geometric circuit for measuring a distance to the subject in a plurality of areas of the photographic frame; and a processor for evaluating backlight in the photographic frame based on measurements obtained by the photometric and geometric circuits, the processor comprising:

(a) a grouping part for grouping the plurality of areas of the photographic frame based on the subject distance measured by the geometric circuit, wherein the grouping part groups adjacent areas within a certain range of distance deviation;

(b) a group brightness calculation part for calculating photometric measurements of each group formed by the grouping part based on the subject brightness measured by the photometric circuit;

(c) a group selection part for selecting a first group among the groups formed by the grouping part; and (d) a backlight evaluation part for evaluating a backlight condition through calculating a difference in photometric measurement between the first group selected by the group selection part and the remaining groups.

2. The photometric backlight evaluation apparatus according to claim 1, wherein the backlight evaluation part confirms the backlight when the difference in photometric measurement between the first group selected by the group selection part and the remaining groups is larger than a certain evaluation value.

3. The photometric backlight evaluation apparatus according to claim 2, wherein the backlight evaluation part changes the evaluation values depending on the first group's position and size in the photographic frame.

4. The photometric backlight evaluation apparatus according to claim 3, wherein the backlight evaluation part has a backlight evaluation value selection table that is referenced using a number corresponding to the geometric areas included in the first group and a middle geometric area thereof and changes the evaluation value depending on the table reference result.

5. The photometric backlight evaluation apparatus according to claim 1, wherein the backlight evaluation part compares an average photometric measurement of the first group with that of the remaining groups and confirms backlight when a difference between them is larger than a certain evaluation value.

6. The photometric backlight evaluation apparatus according to claim 1, wherein the backlight evaluation part compares an average photometric measurement of the first group with a largest photometric measurement of the remaining groups and confirms the backlight when a difference between them is larger than a certain evaluation value.

7. The photometric backlight evaluation apparatus according to claim 1, wherein the grouping part selects as the first group, a plurality of areas that includes the smallest distance data among the distances to the subject measured by the geometric circuit as the first group.

8. The photometric backlight evaluation apparatus according to claim 2, wherein the evaluation values are smaller as the first group is closer to the center of the photographic frame.

9. The photometric backlight evaluation apparatus according to claim 2, wherein the evaluation values are smaller as the first group occupies a larger area in the photographic frame.

10. The photometric backlight evaluation apparatus according to claim 2, wherein evaluation values are smaller as the first group is at a lesser distance.

11. The photometric backlight evaluation apparatus according to claim 1, wherein the geometric circuit comprises area sensors that performs photo-electric conversion of images of the subject in accordance with their light intensity and an image pick-up area of the area sensor is divided to form a plurality of geometric areas.

12. The photometric backlight evaluation apparatus according to claim 1, wherein the geometric and photometric circuits share a same area sensor.

13. A photometric backlight evaluation apparatus comprising:

a photometric circuit for measuring brightness in a plurality of areas of a photographic frame;

a geometric circuit for measuring a plurality of distances to a subject in the photographic frame; and a processor for (a) grouping the plurality of areas in the photographic frame into a first group and other groups based on the plurality of distance data, wherein the processor groups adjacent areas within a certain range of distance deviation, (b) calculating a photometric measurement of the first and other groups based on the brightness data measured by the photometric circuit, and (c) comparing calculated measurements of the respective groups for backlight evaluation in the photographic frame.

14. The photometric backlight evaluation apparatus according to claim 13, wherein the processor confirms backlight when a difference in photometric measurement between the first group and remaining groups is larger than a certain evaluation value.

15. The photometric backlight evaluation apparatus according to claim 14, wherein the processor changes evaluation values depending on the first group's position and size in the photographic frame.

16. The photometric backlight evaluation apparatus according to claim 15, wherein the processor accesses a backlight evaluation value selection table that is referenced using a number corresponding to geometric areas included in the first group and a middle geometric area thereof and changes the evaluation values depending on the table reference result.

17. The photometric backlight evaluation apparatus according to claim 13, wherein the processor compares an average photometric measurement of the first group with that of the remaining groups and confirms backlight when a difference between them is larger than a certain evaluation value.

18. The photometric backlight evaluation apparatus according to claim 13, wherein the processor compares an average photometric measurement of the first group with a largest photometric measurement of the remaining groups and confirms backlight when a difference between them is larger than a certain evaluation value.

19. The photometric backlight evaluation apparatus according to claim 13, wherein the processor selects a plurality of areas as the first group that include smallest distance data among the distances to the subject measured by the geometric circuit.

20. The photometric backlight evaluation apparatus according to claim 14, wherein evaluation values are smaller as the first group is closer to a center region of the photographic frame.

21. The photometric backlight evaluation apparatus according to claim 14, wherein evaluation values are smaller as the first group occupies a larger area in the photographic frame.

22. The photometric backlight evaluation apparatus according to claim 14, wherein evaluation values are smaller as the first group is less distant.

23. The photometric backlight evaluation apparatus according to claim 13, wherein the geometric circuit comprises area sensors that performs photoelectric conversion of images of the subject in accordance with their light intensity and an image pick-up area of the area sensor is divided to form a plurality of geometric areas.

24. The photometric backlight evaluation apparatus according to claim 14, wherein the geometric and photometric circuits share a same area sensor.

25. A photometric backlight evaluation apparatus comprising:

photometric means for measuring brightness of a subject in a plurality of areas of a photographic frame;

geometric means for measuring distance to the subject in a plurality of areas of the photographic frame;

grouping means for grouping the plurality of areas in the photographic frame based on the subject distance measured by the geometric means, wherein the grouping means groups adjacent areas within a certain range of distance deviation;

group brightness calculation means for calculating photometric measurements of each group formed by the grouping part based on the subject brightness measured by the photometric means;

group selection means for selecting a first group among groups formed by the grouping means; and backlight evaluation means for calculating a difference in the photometric measurement between the first group selected by the group selection means and remaining groups to evaluate backlight of the photographic frame, the backlight evaluation means changes backlight evaluation values depending on the first group's position and size in the photographic frame or the distance thereof.

26. A photometric apparatus, comprising:

a photometric part having a lens for receiving light from a subject, a light receiving element for receiving light that is transmitted through the lens, and a circuit for processing an output from the light receiving element for measuring brightness in a plurality of areas of a photographic range;

a geometric part having a lens for receiving light from a subject, a light receiving element for receiving light that is transmitted through the lens, and a circuit for processing an output from the light receiving element for measuring distance to the subject in a plurality of areas of the photographic range; and a processor in which certain programs are executed to perform a function to select a plurality of areas in the photographic range by selecting the shortest distance area and adjacent areas having a certain range of distance deviation therefrom using geometry result from the geometric part and a function to determine exposure using measurements of the selected areas from the photometric part.

27. The photometric apparatus according to claim 26, wherein the processor has a function to evaluate backlight using the measurement of the selected areas obtained by the photometric part and a measurement of areas excluded from the selected area that is obtained by the photometric part.

28. The photometric apparatus according to claim 27, wherein the processor uses the combined size of the selected areas in the photographic range as an evaluation factor for evaluating the backlight.

29. The photometric apparatus according to claim 27, wherein the CPU determines a position in the photographic range, which position represents the positions of all of the selected areas and uses the determined position as an evaluation factor for evaluating backlight.

30. The photometric apparatus according to claim 27, wherein the processor uses the distance to the subject of the selected areas as an evaluation factor for evaluating backlight.

31. The photometric apparatus according to claim 27, wherein the processor uses a focal length of the photographic lens as an evaluation factor for evaluating backlight.

32. The photometric apparatus according to claim 27, wherein the processor uses an F number of the photographic lens as an evaluation factor for evaluating backlight.

33. A method for evaluating backlight comprising:

measuring brightness in a plurality of areas of a photographic range by means of a photometric part having a lens for receiving light from a subject, a light receiving element for receiving light that is transmitted through the lens, and a circuit for processing an output from the light receiving element;

measuring distance to the subject in a plurality of areas of the photographic range by means of a geometric part having a lens for receiving light from a subject, a light receiving element for receiving light that is transmitted through the lens, and a circuit for processing an output from the light receiving element; and selecting a plurality of areas in the photographic range by selecting the shortest distance area and adjacent areas having a certain range of distance deviation from the shortest distance area using a geometry result from the geometric part and evaluating backlight using a measurement of the selected area that is obtained by the photometric part and a measurement of the areas excluded from the selected area that is obtained by the photometric part by means of a processor in which certain programs are executed.

34. A photometric backlight evaluation apparatus comprising:

a photometric circuit for measuring a brightness of a subject in a plurality of areas of a photographic frame;

a geometric circuit for measuring a distance to the subject in a plurality of areas of the photographic frame; and a processor for evaluating backlight in the photographic frame based on measurements obtained by the photometric and geometric circuits, the processor comprising:

(a) a grouping part for grouping the plurality of areas of the photographic frame based on the subject distance measured by the geometric circuit;

(b) a group brightness calculation part for calculating photometric measurements of each group formed by the grouping part based on the subject brightness measured by the photometric circuit;

(c) a group selection part for selecting a first group among the groups formed by the grouping part; and (d) a backlight evaluation part for evaluating a backlight condition through calculating a difference in photometric measurement between the first group selected by the group selection part and the remaining groups, wherein the backlight evaluation part confirms the backlight when the difference in photometric measurement between the first group selected by the group selection part and the remaining groups is larger than a certain evaluation value, changes the evaluation values depending on the first group's position and size in the photographic frame, and has a backlight evaluation value selection table that is referenced using a number corresponding to the geometric areas included in the first group and a middle geometric area thereof and changes the evaluation value depending on the table reference result.

35. A photometric backlight evaluation apparatus comprising:

a photometric circuit for measuring brightness in a plurality of areas of a photographic frame;

a geometric circuit for measuring a plurality of distances to a subject in the photographic frame; and a processor for grouping the plurality of areas in the photographic frame into a first group and other groups based on the plurality of distance data, calculating a photometric measurement of the first and other groups based on the brightness data measured by the photometric circuit, and comparing calculated measurements of the respective groups for backlight evaluation in the photographic frame, wherein the processor confirms backlight when a difference in photometric measurement between the first group and remaining groups is larger than a certain evaluation value, changes evaluation values depending on the first group's position and size in the photographic frame, and accesses a backlight evaluation value selection table that is referenced using a number corresponding to geometric areas included in the first group and a middle geometric area thereof and changes the evaluation values depending on the table reference result.

36. A photometric apparatus, comprising:

a photometric unit for measuring a brightness of a subject in a plurality of areas of a photographing frame;

a geometric unit for measuring a distance of a subject in a plurality of areas of the photographing frame; and a processor for performing at least the following functions:

selecting areas corresponding to a main subject from the plurality of areas of the geometric unit using the measured distance of the each area so that the combined size of the selected area reflects the size of the main subject on the photographing frame; and deciding photometric value of the selected areas based on the measuring result of the photometric unit.

37. A photometric apparatus, comprising:

a photometric unit for measuring a brightness of a subject in a plurality of areas of a photographing frame;

a geometric unit for measuring a distance of a subject in a plurality of areas of the photographing frame; and a processor for performing at least the following functions:

grouping the plurality of areas of the geometric unit by classifying adjacent areas within a certain range of distance into one group; and evaluating a backlight condition by comparing brightness of the groups based on the measuring result of the photometric unit.

* * * * *